(12) United States Patent
Tokita

(10) Patent No.: US 11,528,372 B2
(45) Date of Patent: Dec. 13, 2022

(54) IMAGE PROCESSING SYSTEM FOR PROVIDING ATTRIBUTE INFORMATION, IMAGE PROCESSING METHOD AND STORAGE MEDIUM

(71) Applicant: CANON KABUSHIKI KAISHA, Tokyo (JP)

(72) Inventor: Ken Tokita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/217,256

(22) Filed: Mar. 30, 2021

(65) Prior Publication Data

US 2021/0314449 A1 Oct. 7, 2021

(30) Foreign Application Priority Data

Apr. 3, 2020 (JP) .............................. JP2020-067335

(51) Int. Cl.
*H04N 1/00* (2006.01)
*H04N 1/40* (2006.01)
*G06V 30/40* (2022.01)
*G06V 30/10* (2022.01)

(52) U.S. Cl.
CPC .......... *H04N 1/0044* (2013.01); *G06V 30/40* (2022.01); *H04N 1/40* (2013.01); *G06V 30/10* (2022.01); *H04N 2201/0094* (2013.01)

(58) Field of Classification Search
CPC ................... H04N 1/0044; H04N 1/40; H04N 2201/0094; H04N 1/40062; H04N 1/4177; G06K 9/00442; G06K 2209/01
See application file for complete search history.

(56) References Cited

U.S. PATENT DOCUMENTS

| | | | | |
|---|---|---|---|---|
| 8,953,228 | B1* | 2/2015 | Mehers ................ | G06V 10/235 |
| | | | | 705/14.1 |
| 2002/0188669 | A1* | 12/2002 | Levine .................... | H04L 29/06 |
| | | | | 707/999.107 |
| 2005/0251748 | A1* | 11/2005 | Gusmorino ........... | G06F 3/0481 |
| | | | | 715/713 |
| 2011/0286043 | A1* | 11/2011 | Hagisawa .......... | G06V 30/1444 |
| | | | | 358/1.15 |

FOREIGN PATENT DOCUMENTS

JP 2001154779 A 6/2001

\* cited by examiner

*Primary Examiner* — King Y Poon
*Assistant Examiner* — Michael L Burleson
(74) *Attorney, Agent, or Firm* — Canon U.S.A., Inc. IP Division

(57) ABSTRACT

In a system, a setting window including at least a preview region in which a scanned image is previewed and a text field to which attribute information on the scanned image is input is displayed, when a character region within the scanned image previewed in the setting window is moused over, control to preliminarily display a character string corresponding to the moused-over character region in the text field is performed, and when the moused-over character region is clicked by a mouse, control to fix the character string preliminarily displayed in the text field is performed.

20 Claims, 9 Drawing Sheets

FIG. 6A

Scanned Business Form List

| Business form name | Destination | Status | Type |
|---|---|---|---|
| 001 | Cloud storage A | Not yet learned | Estimate |
| 002 | Cloud storage A | Not yet learned | Estimate |
| 003 | Cloud storage A | Learned | Invoice AAA |
| 004 | Cloud storage A | Not yet learned | Estimate |
| 005 | Cloud storage A | Learned | Invoice BBB |

Buttons: Send, Edit, Delete

IMAGE PROCESSING SYSTEM FOR PROVIDING ATTRIBUTE INFORMATION, IMAGE PROCESSING METHOD AND STORAGE MEDIUM

BACKGROUND

Field

The aspect of the embodiments relates to an image processing system for setting attribute information to a scanned image.

Description of the Related Art

A conventional image processing system scans and digitizes a paper business form, sets an attribute such as a file name of the scanned image of the digitized business form based on the written content of the business form, and thereby manages the business form. One method of setting such attribute is a method of setting an attribute based on a recognition result obtained by performing a character recognition process on a scanned image of a business form.

In the system as described above, one conceivable method is to set a character in an image as an attribute in response to a click on a character region in a preview image displayed after performing character recognition on a business form image. Japanese Patent Application Laid-Open No. 2001-154779 discloses that, as a processing method for clearly indicating characters that the user intends to set and preventing erroneous selection in a click operation on a character region, a larger mouse cursor is displayed when a larger character is pointed, and a smaller mouse cursor is displayed when a smaller character is pointed.

SUMMARY

The image processing system includes: a display unit that displays a setting window including at least a preview region in which a scanned image is previewed and a text field to which attribute information on the scanned image is input; and a control unit that, when a character region within the scanned image previewed in the setting window is moused over, performs control to preliminarily display a character string corresponding to the moused-over character region in the text field and, when the moused-over character region is clicked by a mouse, performs control to fix the character string preliminarily displayed in the text field.

Further features of the present disclosure will become apparent from the following description of exemplary embodiments with reference to the attached drawings.

BRIEF DESCRIPTION OF THE DRAWINGS

FIG. 6A is a diagram illustrating an example of a window displayed on an operation unit of the MFP.

DESCRIPTION OF THE EMBODIMENTS

Figure 1:
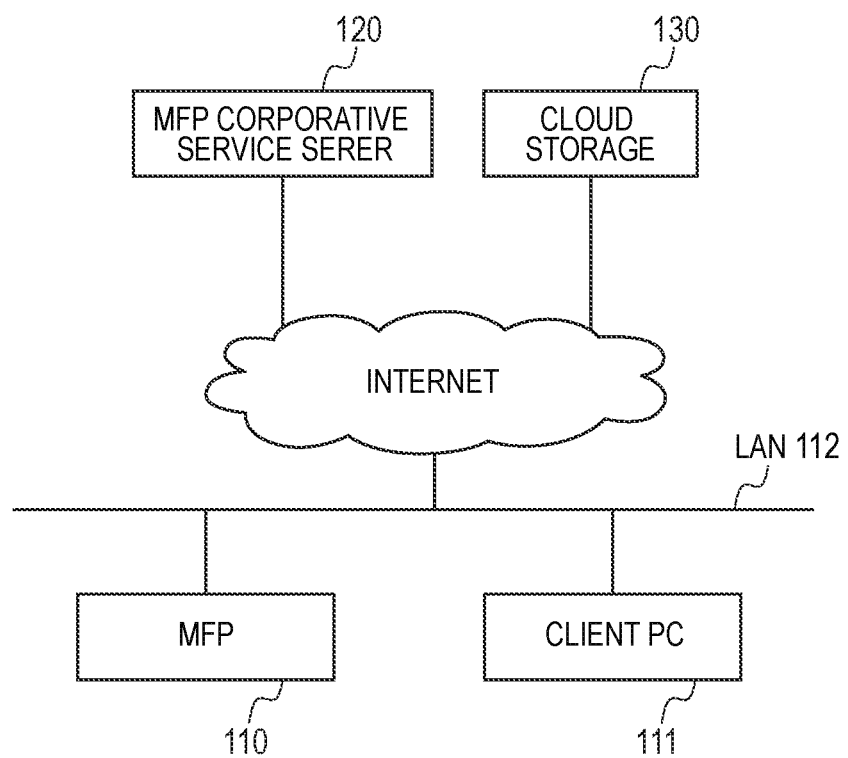
FIG. 1 is a diagram illustrating a general configuration of the present disclosure.

FIG. 1 is a diagram illustrating an overall configuration of the hardware of a system of a first embodiment. An image processing system includes a Multifunction Peripheral (MFP) 110 that is an image processing apparatus, a client PC 111, an MFP cooperative service server 120, and a cloud storage 130. The MFP 110 and the client PC 111 are connected in a communicative manner to a server that provides various services on the Internet via a local area network (LAN) 112.

The MFP 110 is a multifunction machine having a plurality of functions such as a scanner or a printer and is an example of an image processing apparatus.

The client PC 111 is a computer that receives a service requested from the MFP cooperative service server 120.

The MFP cooperative service server 120 is a server having a function of storing an image file scanned by the MFP 110 on the server of its own or transferring such an image file to a service that can store a file, such as another storage service.

The cloud storage 130 corresponds to a service that can store a file via the Internet or acquire a file on a web browser.

Note that, although the image processing system of the present embodiment has the configuration formed of the MFP 110, the client PC 111, the MFP cooperative service server 120, and the cloud storage 130, the configuration is not limited thereto. For example, the MFP 110 may have both the roles of the client PC 111 and the MFP cooperative service server 120. Further, the MFP cooperative service server 120 may be arranged in a server on the LAN 112 instead of on the Internet. Further, the cloud storage 130 may be replaced with a mail server or the like and attach a scanned image to a mail and transmit the mail.

Figure 2:
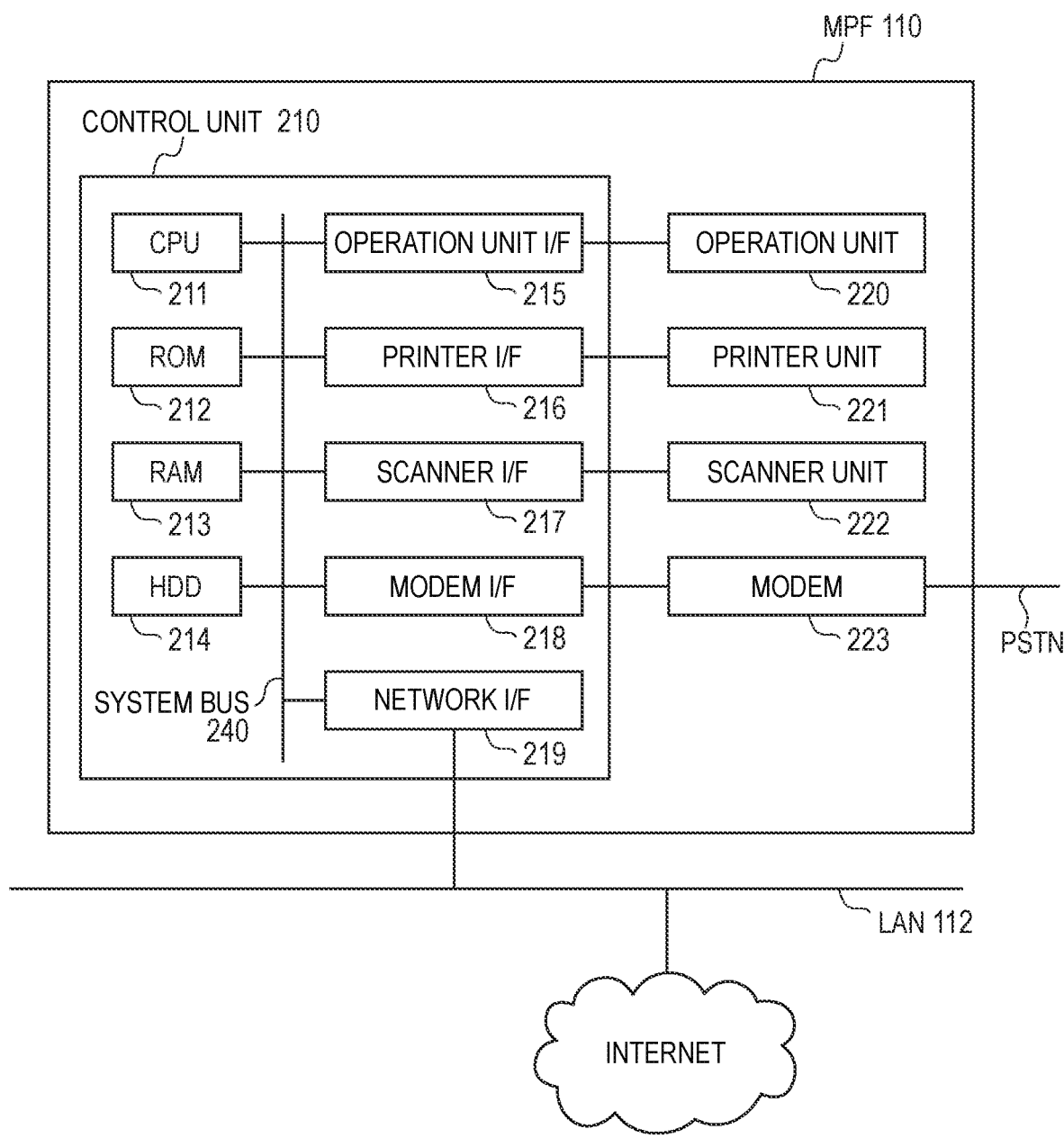
FIG. 2 is a hardware configuration diagram of an MFP.

FIG. 2 is a hardware configuration diagram of the MFP 110. The MFP 110 is formed of a control unit 210, an operation unit 220, a printer unit 221, a scanner unit 222, and a modem 223. The control unit 210 is formed of the following units 211 to 219 connected to each other via a system bus 240 and controls the overall operation of the MFP 110. The CPU 211 reads a control program stored in the ROM 212 and performs and controls various functions of the MFP 110, such as reading, printing, or communication. The RAM 213 is used as a temporary storage region such as a main memory, a work area, or the like of the CPU 211. Note that, although a single CPU 211 uses a single storage region (the RAM 213 or the HDD 214) to perform each process illustrated in a flowchart described later in the present embodiment, the embodiment is not limited thereto. For example, each process may be performed in cooperation of a plurality of CPUs or a plurality of RAMs or HDDs. The HDD 214 is a mass storage unit that stores image data or various programs.

The operation unit I/F 215 is an interface that connects an operation unit 220 and the control unit 210 to each other. The operation unit 220 is equipped with a touch panel or a keyboard or the like and accepts a user operation, input, or instruction.

The printer I/F 216 is an interface that connects the printer unit 221 and the control unit 210 to each other. Image data used for printing is transferred from the control unit 210 to the printer unit 221 via the printer I/F 216 and printed on a recording medium. The scanner I/F 217 is an interface that connects the scanner unit 222 and the control unit 210 to each other. The scanner unit 222 reads a document set on a document glass table (not illustrated) or an Auto Document Feeder (ADF), generates image data, and inputs the generated image data to the control unit 210 via the scanner I/F 217. The MFP 110 can perform file transmission or mail transmission in addition to print output (copy) from the printer unit 221 for image data generated by the scanner unit 222. The modem I/F 218 is an interface that connects the modem 223 to the control unit 210. The modem 223 performs facsimile communication of image data with a facsimile apparatus on the PSTN. The network I/F 219 is an interface that connects the control unit 210 (MFP 110) to the LAN 112. The MFP 110 transmits image data or information to each service on the Internet or receives various information by using the network I/F 219.

Figure 3:
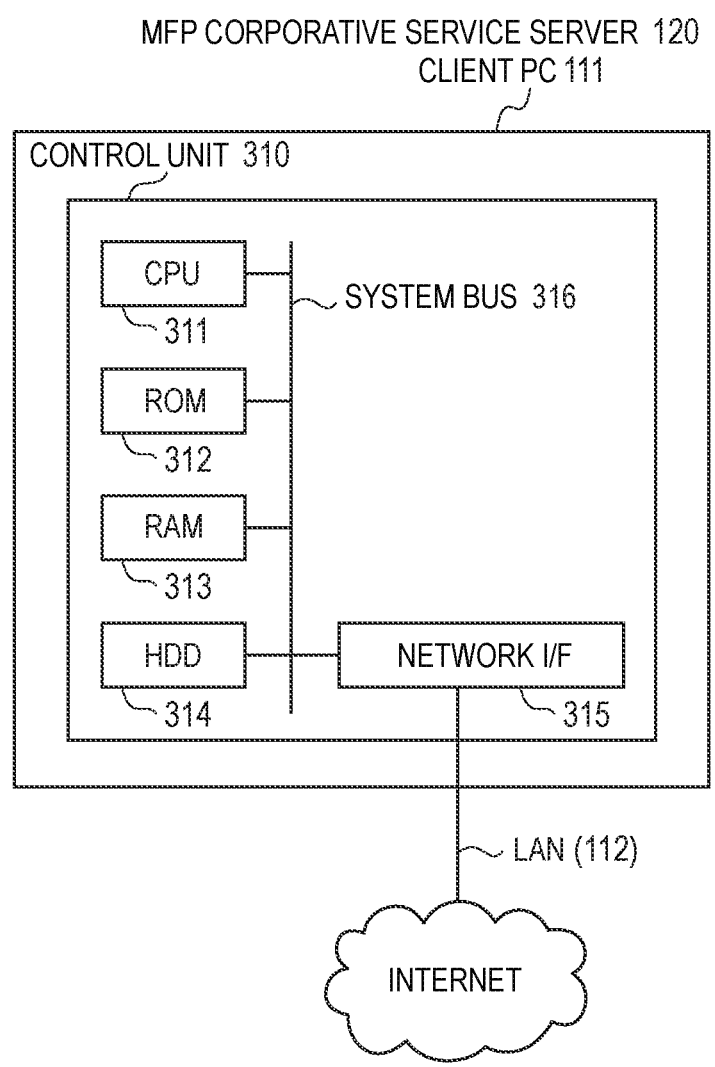
FIG. 3 is a hardware configuration diagram of a client PC and an MFP cooperative service server.

FIG. 3 is a hardware configuration diagram of the client PC 111 and the MFP cooperative service server 120. Each of the client PC 111 and the MFP cooperative service server 120 is a so-called information processing apparatus and is formed of a CPU 311, a ROM 312, a RAM 313, an HDD 314, and a network I/F 315, which are connected to each other via a system bus 316.

The CPU 311 reads a control program stored in the ROM 312 to perform various processes and thereby controls the overall operation. The RAM 313 is used as a temporary storage region such as a main memory, a work area, or the like of the CPU 311. The HDD 314 is a mass storage unit that stores image data or various programs. The network I/F 315 is an interface that connects the client PC 111, the MFP cooperative service server 120, and the cloud storage 130 to a network. The client PC 111 is connected to the LAN 112 on premises, and the MFP cooperative service server 120 and the cloud storage 130 are connected to the Internet via a LAN 112 on premises. Further, the MFP cooperative service server 120 and the cloud storage 130 transmit and receive various information in response to a process request from another apparatus (MFP 110 or the like) via the network I/F 315.

Figure 4:
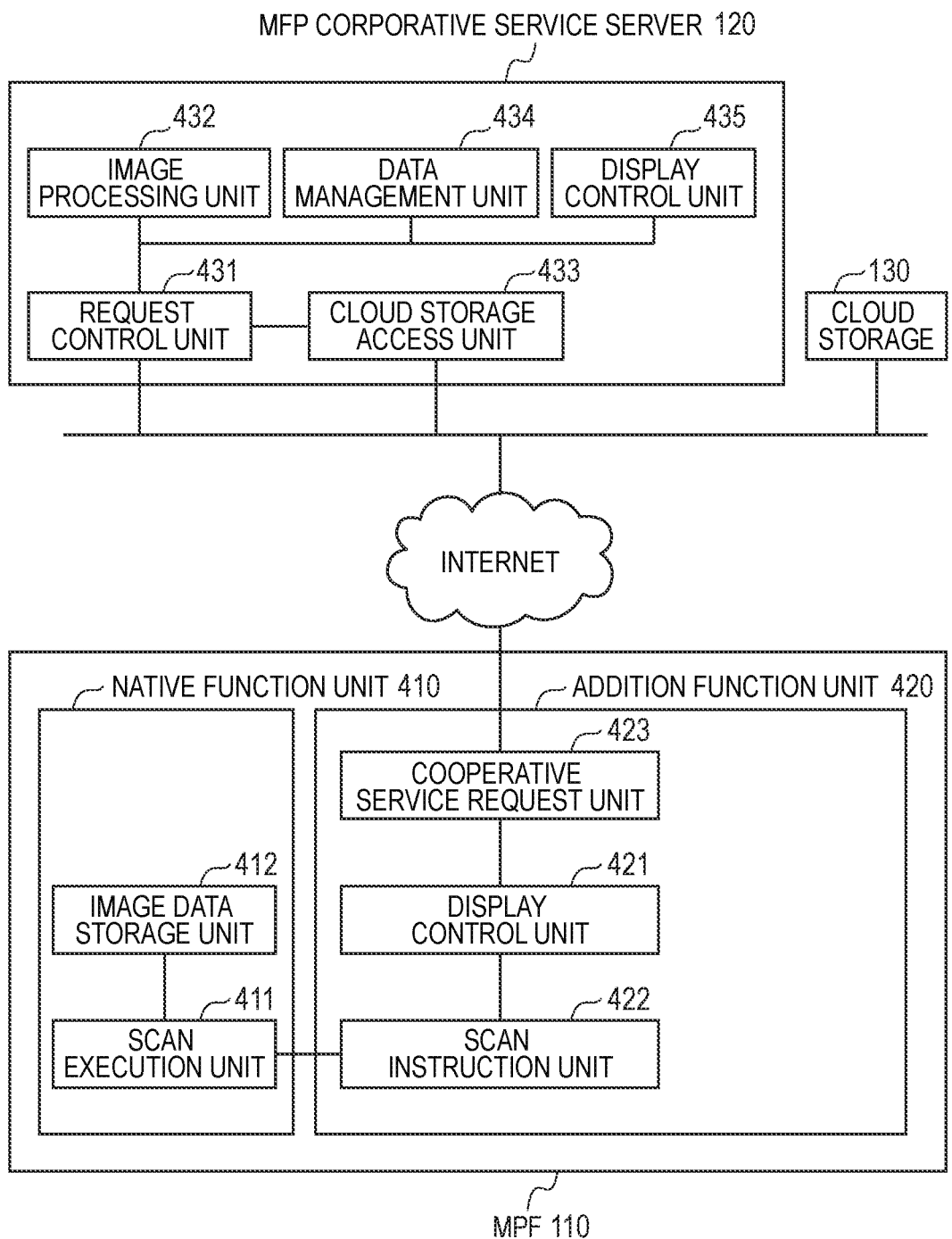
FIG. 4 is a software configuration diagram of the present disclosure.

FIG. 4 is a software configuration diagram of an image processing system according to the present embodiment.

The MFP 110 is generally divided into two, namely, a native function unit 410 and an addition function unit 420. Each unit included in the native function unit 410 is provided typically to the MFP 110, and the addition function unit 420 is an application additionally installed in the MFP 110. The addition function unit 420 is an application based on Java (registered trademark) and can easily implement addition of a function to the MFP 110. Note that another additional application (not illustrated) may be installed in the MFP 110. The native function unit 410 has a scan execution unit 411 and an image data storing unit 412. The addition function unit 420 has a display control unit 421, a scan instruction unit 422, and a cooperative service request unit 423.

The display control unit 421 displays a UI window used for accepting a user operation on a liquid crystal display unit having a touch panel function of the operation unit 220 of the MFP 110. For example, the display control unit 421 displays a UI window such as a window used for operations of entry of authentication information for access to the MFP cooperative service server 120, setting of scan, and starting of scan, a preview window, or the like.

The scan instruction unit 422 requests the scan execution unit 411 to perform a scan process in accordance with a user instruction input via a UI window together with a scan setting.

The scan execution unit 411 receives a scan request including a scan setting from the scan instruction unit 422. The scan execution unit 411 generates scanned image data of a document placed on the document glass table and read by the scanner unit 222 via the scanner I/F 217 in accordance with a scan request. The generated scan image data is transmitted to the image data storing unit 412. Further, the scan execution unit 411 transmits, to the scan instruction unit 422, a scan image identifier uniquely indicating the stored scanned image data. The scan image identifier is a string of numbers, symbols, alphabets, or the like (not illustrated) used for uniquely identifying an image scanned by the MFP 110. The image data storing unit 412 stores scanned image data received from the scan execution unit 411 in the HDD 214.

The scan instruction unit 422 acquires, from the image data storing unit 412, scan image data corresponding to a scan image identifier received from the scan execution unit 411. The scan instruction unit 422 requests the cooperative service request unit 423 to instruct the MFP cooperative service server 120 to process the acquired scan image data.

The cooperative service request unit 423 requests the MFP cooperative service server 120 to perform various processes, for example, login, analysis of a scanned image, transmission of a scanned image, or the like. The cooperative service request unit 423 communicates with the MFP cooperative service server 120 by using a protocol such as REST or SOAP, however, other communication schemes may be used.

The MFP cooperative service server 120 has a request control unit 431, an image processing unit 432, a cloud storage access unit 433, a data management unit 434, and a display control unit 435.

The request control unit 431 stands by all the time in a state of being able to receive a request from an external apparatus. In response to receiving a process request, the request control unit 431 instructs the image processing unit 432, the cloud storage access unit 433, and the data management unit 434 to perform a process as appropriate in accordance with the request.

The image processing unit 432 performs a recognition process or an image processing process on an image, such as character region analysis, Optical Character Recognition (OCR), similar-business form determination (which will be described in a process of S510 in FIG. 5 described later), correction of rotation or inclination of an image, or the like.

The cloud storage access unit 433 requests the cloud storage 130 to perform a process. In general, the cloud service exposes various interfaces used for storing a file in a cloud storage or acquiring a stored file by using a protocol such as REST or SOAP. The cloud storage access unit 433 operates the cloud storage 130 by using an interface of an exposed cloud storage.

The data management unit 434 holds user information, various setting data, or the like managed by the MFP cooperative service server 120.

The display control unit 435 returns window configuration information (HTML, CSS, or the like) required for window display in response to a request from a web browser operating on another terminal (not illustrated) such as a PC or a mobile connected via the Internet. The user may confirm user information registered in the MFP cooperative service server 120 via a window displayed in the web browser or change a setting in performing a scan.

Note that, although an example of the configuration to install the addition function unit 420 in the MFP 110 is illustrated in FIG. 4, the aspect of the embodiments is not limited to such a configuration, and the function of the addition function unit 420 may be included in the client PC 111.

Figure 5:
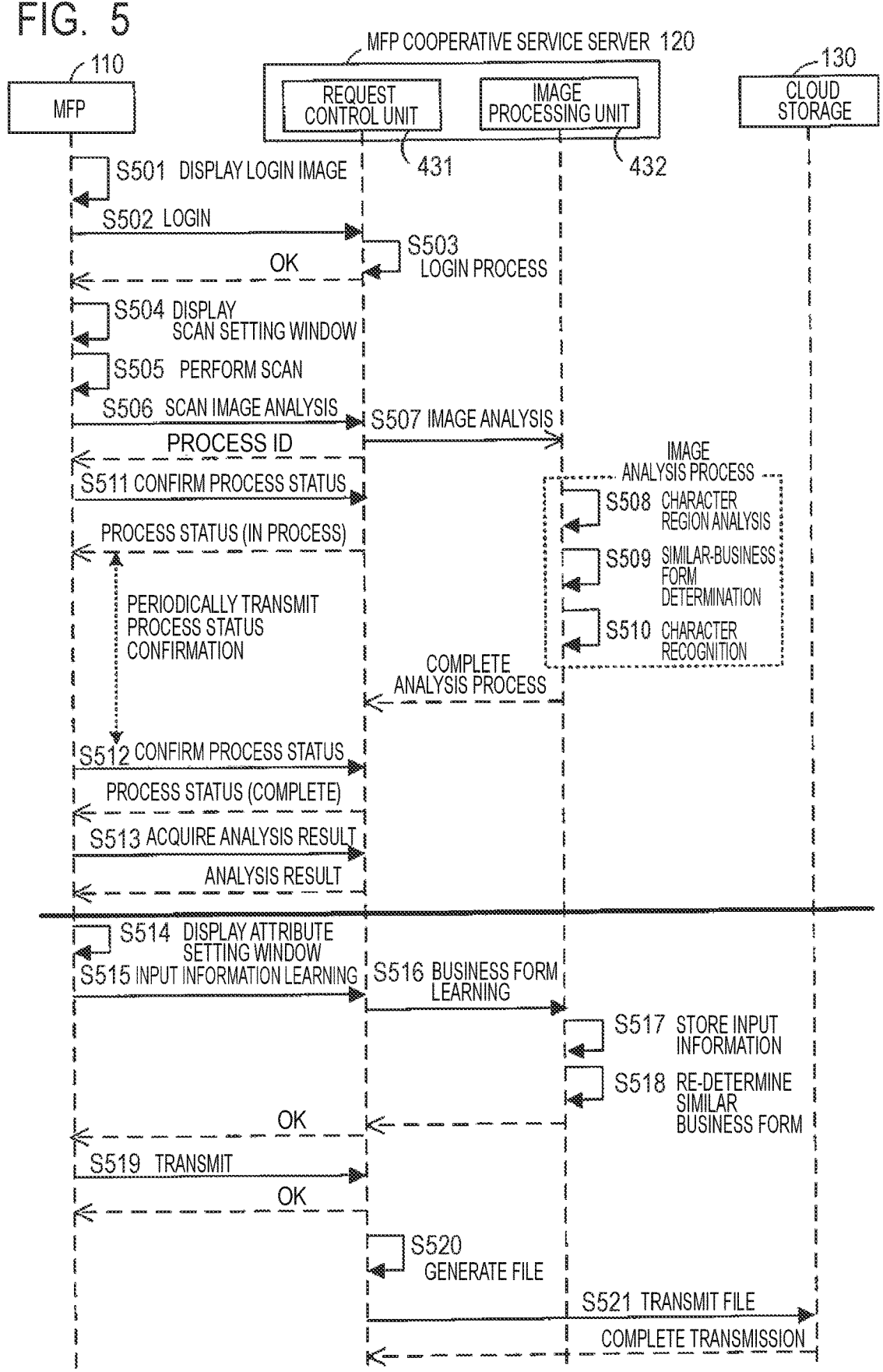
FIG. 5 is a sequence diagram illustrating a flow of a process between respective devices.

FIG. 5 is a sequence diagram illustrating a flow of a process between respective apparatuses when processing an image scanned by the MFP 110 into a file and transmitting the file to the cloud storage. In this example, communication between respective apparatuses is mainly described. Note that, although FIG. 5 illustrates an operation in which the MFP 110 communicates with the MFP cooperative service server 120, acquisition of an analysis result, display of a window, an instruction of learning, or the like described later may be performed by the client PC 111 instead of the MFP 110.

The MFP 110 displays, on a touch panel of the operation unit 220, a main window in which buttons used for implementing respective functions to be provided are arranged in a normal state. When an additional application used for scanning a business form and transmitting the image file thereof to the cloud storage 130 (hereafter, referred to as "scan app") is installed in the MFP 110, a button for using the function of the application is then displayed on the main window of the MFP 110. When this button is pressed, a window used for transmitting the scanned business form to the cloud storage 130 is then displayed, and the process illustrated in the sequence of FIG. 5 is performed.

In S5010, the scan app displays a login window (not illustrated) for entry of authentication information used for accessing the MFP cooperative service server 120.

In S502, in response to entry of a user ID or the like to the login window by the user, the scan app requests the MFP cooperative service server 120 for login.

In S503, the MFP cooperative service server 120 matches and inspects a user name and a password included in the login request with the user information managed by the data management unit 434 to determine whether or not the user name and the password are correct and, if correct, returns an access token to the MFP 110. Various requests subsequently issued from the MFP 110 to the MFP cooperative service server 120 are provided together with this access token, and the user to be processed can be identified by the access token. The user authentication method is performed by using a generally known scheme (authorization using Basic authentication, Digest authentication, authentication using OAuth, or the like).

The MFP 110 displays a scan setting window in S504 in response to completion of the login process. The user performs setting regarding various scan reading, places a paper business form to be scanned on the document glass table or the ADF, and presses a "scan start" button. In response, in S505, the MFP 110 performs a scan and generates data of the scanned image digitized from the paper business form.

In subsequent S506, the MFP 110 transmits an analysis request of the scanned image to the MFP cooperative service server 120 together with the image generated by the scan process.

In S507, the request control unit 431 of the MFP cooperative service server 120 requests image analysis from the image processing unit 432 in response to receiving an analysis request of the scanned image. The request control unit 431 of the MFP cooperative service server 120 then returns "processId", which is an identifier uniquely identifying an analysis request of the requested scanned image, to the MFP 110 without waiting for the end of the image analysis process.

On the other hand, the image processing unit 432 of the MFP cooperative service server 120 that has received the request for image analysis performs an image analysis process (S508 to S510).

The image processing unit 432 analyzes a character region present within the image in S508 of the image analysis process. This is to analyze arrangement information or the like on a character region.

Subsequently, in S509, the image processing unit 432 compares the arrangement information on the past scanned image with the arrangement information on the current scanned image by using the arrangement information on the character region within the business form and determines whether or not an image having a similar arrangement of a character region is scanned. This process is referred to as a similar-business form determination. The information on the past scanned image used in this determination has been stored and accumulated by the process of S517 described later.

Then, in S510, based on the determination result, a character recognition process is performed on the analyzed character region. Note that details of a display process based on the result of the image analysis process of S508 to S510 will be described later with reference to FIG. 7.

On the other hand, in S511, the MFP 110 uses the "processId" received in the response of S506 to confirm the status of the analysis process of the scanned image related to "processId" with the MFP cooperative service server 120 periodically (for example, around every several hundred milliseconds to several milliseconds or the like). Although not depicted, the process of S511 is continued periodically until a response of image process completion of the MFP cooperative service server 120 is acquired (until the timing of S512). In response to receiving a request for process status confirmation of S511, the request control unit 431 of the MFP cooperative service server 120 confirms the status of the process of "processId" and returns the process status as a response.

In such a response, a character string indicating the current process status is stored in "status". For example, when "status" is "processing", this indicates that the MFP cooperative service server 120 is in processing, and when "status" is "completed", this indicates a state where the process is completed. Note that other status may be returned, such as "failed" when the process failed. Further, a response when a process is completed (when "status" is "completed") includes information on a result of analysis of the scanned image, a scan setting, or the like together with the status. When the image analysis process ends, a notification indicating that the image analysis process is completed is issued from the image processing unit 432 to the request control unit 431.

After the completion of the image analysis process in the MFP cooperative service server 120, when the MFP 110 confirms the process status with the MFP cooperative service server 120 in S512, a response of the process status indicating that the image analysis process is completed is returned from the request control unit 431.

Subsequently, in S513, the MFP 110 requests the request control unit 431 to acquire an image analysis result and receives a response related to an analysis result from the request control unit 431. The MFP 110 then acquires image analysis result information from a URL in which result information included in the response is stored. When a similar business form is present, attribute information as an image analysis result is also included. The MFP 110 displays a scanned business form list window 600 (FIG. 6A) on the operation unit 220.

In S514, once the user selects a scanned image from the scanned business form list window 600 displayed on the operation unit 220, the MFP 110 displays an attribute setting window 610 (FIG. 6B) used for setting attribute information such as a file name on the operation unit 220. Note that, although an example of setting a file name and a value corresponding to a company name is illustrated as attribute information in FIG. 6B, the type of attribute (item name) is not limited thereto. For example, an attribute (item name) such as an address or an amount may be newly added as an attribute, and an attribute value corresponding thereto may be able to be set. Details of the attribute setting window 610 will be described later.

The user presses an "OK" button after setting the attribute information for the scanned business form in the attribute setting window. In S515, the MFP 110 transmits a request for learning the business form to the MFP cooperative service server 120 by using the information on the character region, which has been used for setting the attribute, as input information.

In S516, the request control unit 431 of the MFP cooperative service server 120 that has received the information on the character region, which has been used for setting the attribute, requests the image processing unit 432 to learn the business form.

In S517, the image processing unit 432 stores the information on the character region of the entire image and the information received in S516 on the character region used by the user for setting the attribute as input information for learning.

Further, in S518, if a business form similar to the business form stored in S517 is present, the MFP cooperative service server 120 again performs a similar-business form determination process. When the learning ends, the MFP cooperative service server 120 informs the MFP 110 of the end of the learning. Herein, learning is an operation to store a business form and data of arrangement information on a character region of the business form in association with each other.

Then, in S519, the MFP 110 transmits, to the MFP cooperative service server 120, the scanned image and the attribute information such as a file name set after processing the scanned image into a file. In response to receiving a request, the MFP cooperative service server 120 replies to the MFP 110 to indicate that the request has been successfully received. In response to receiving the response to the transmission, the MFP 110 ends the process and moves back to the display of the scan setting window of S504.

In S520, the request control unit 431 of the MFP cooperative service server 120 starts a file generation process. Herein, the MFP cooperative service server 120 acquires information on a file format to be transmitted to the cloud storage 130 from a scan setting registered in the MFP cooperative service server 120 and generates a file from the scanned image based on the setting.

Then, in S521, the request control unit 431 of the MFP cooperative service server 120 sets the attribute information received in S519 and transmits the generated file to the cloud storage 130. In response to receiving the file, the cloud storage 130 returns a response of transmission completion to the MFP cooperative service server 120.

Figure 6B:
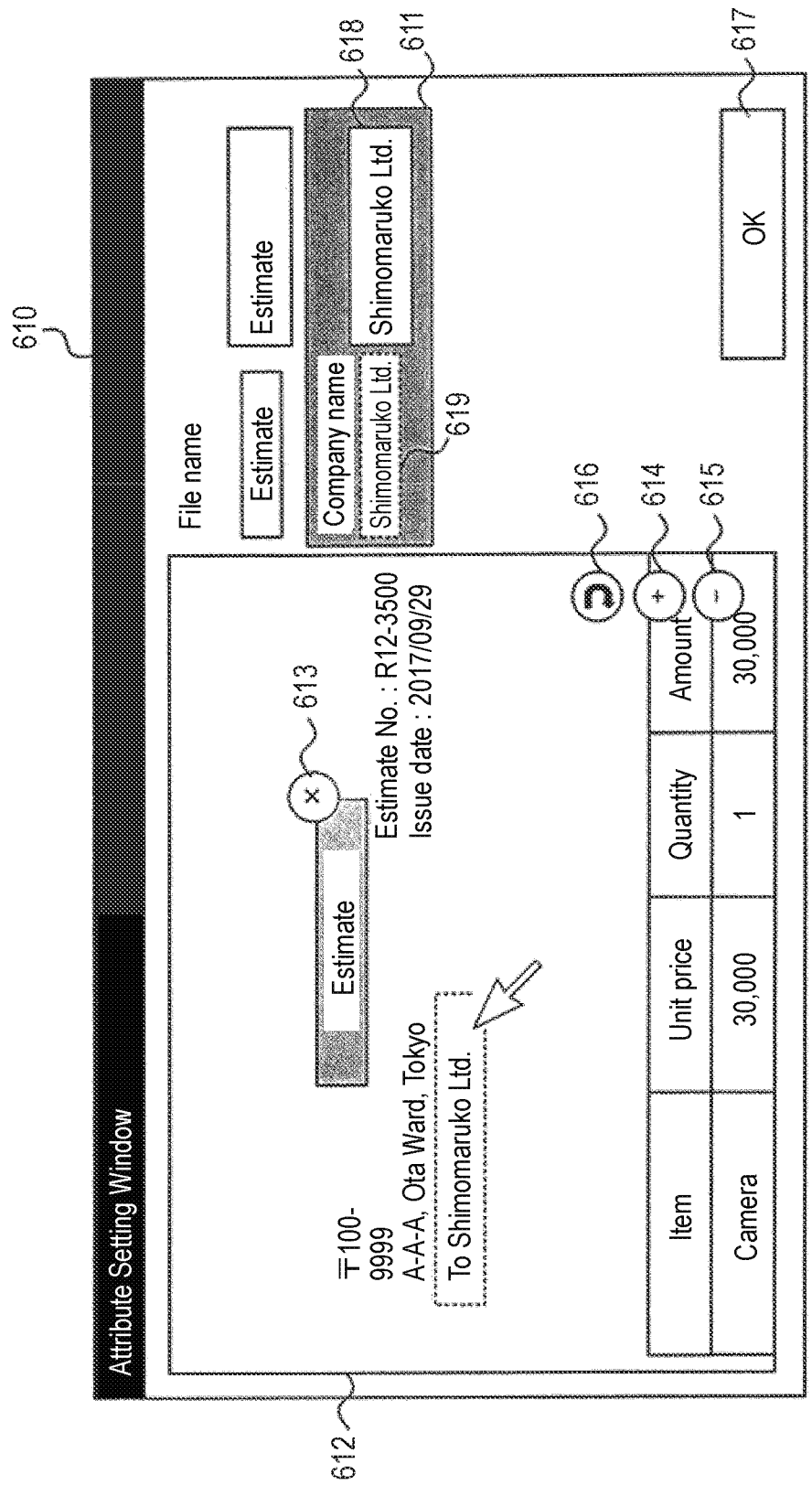
FIG. 6B is a diagram illustrating an example of a window displayed on an operation unit of the MFP.

FIG. 6A and FIG. 6B are diagrams illustrating examples of a window displayed by the MFP 110. The display control of these windows is performed by the display control unit 421. Note that such windows may be displayed on the client PC 111 as described previously.

FIG. 6A is a diagram illustrating an example of the scanned business form list window 600. This window enables viewing of a list of business forms after completion of a scan and an image analysis process and before transmission to the cloud storage 130 (S513 of FIG. 5). Further, this window is formed of a scanned business form list 601, a send button 602, an edit button 603, and a delete button 604.

The scanned business form list 601 is an area that displays a list of business forms for which a scan and an image analysis process (S505 to S510) are completed. This area is formed of fields of business form name 605, destination 606, status 607, and type 608. The business form name 605 is an identifier that uniquely identifies the name of a business form. The destination 606 is a name of the cloud storage 130 that is a destination of a file of a business form. The status 607 indicates a result when similar-business form determination is performed on a business form, and either "not yet learned" or "learned" is displayed. The "not yet learned" means that it is determined that no similar business form is present, and the "learned" means that it is determined that a similar business form is present. The type 608 represents the type of a business form. For example, "estimate" or "invoice" is displayed. Further, for a business form having the status 607 of "learned", a detailed type as to which invoice format the business form corresponds to, such as "Invoice AAA" or "Invoice BBB", is displayed. This is associated with the best similar business form determined by a similar-business form determination process.

The send button 602 is a button used for transmitting a business form to the cloud storage 130. The user may select any business form from the scanned business form list 601 and press the send button 602 to perform transmission to the cloud storage 130 displayed in the destination 606. Note that, when transmission is successfully completed, the business form is deleted from the list.

The edit button 603 is a button used for moving to the attribute setting window 610 described later. The user may select any business form from the scanned business form list 601 and press the edit button 603, and thereby the window moves to the attribute setting window 610 (FIG. 6B) for the selected business form, which enables the user to edit the attribute setting.

The delete button 604 is a button used for deletion of a business form. The user may select any business form from the scanned business form list 601 and press the delete button 604 to delete the selected business form.

FIG. 6B is a diagram illustrating an example of the attribute setting window 610 (S514 of FIG. 5). The attribute region 611 is a region in which attribute information set by the user is displayed. In the attribute region 611, a text field 618 for entry of attribute information and a cutout image 619 of a character region described later are displayed. When no character region is selected, the attribute region 611 is displayed in a state where the text field is empty and no cutout image is set. Further, a character region that is selectable by a click or the like may be displayed with a changed background color or displayed with a frame surrounding the selected character region so that the user can identify the character region.

The preview region 612 displays a scanned image. When a character region of an image is moused over, the character region is displayed with a colored frame line surrounding the character region or displayed with a changed color thereof so that the user can identify the moused-over character region. Furthermore, a character string of the character region is preliminarily displayed in the text field 618. Further, a cutout image of the character region is preliminarily displayed in the cutout image 619. The text field 618 and the cutout image 619 are switched every time the moused-over character region changes. At this time, to notify the user that what is displayed is a preliminary setting, the frame line of a character region or a cutout image is displayed in a display form that is different from a display form applied when the selection is fixed by a click on a character region described later. Details will be described with reference to the flowchart of FIG. 7. When a moused-over character region is then clicked by a mouse, selection of a character region corresponding to the clicked position is fixed. To visualize that the selection is fixed, the character region for which selection is fixed is displayed with a figure such as a line or a frame line, a background color, or the like. Note that frames of the selected character regions may be displayed with different colors for respective attributes to be set, or when a plurality of character regions are selected for a single attribute, the colors of respective character regions may be different colors. Further, the preview display position may be changed so that the selected character region comes to the center, or the enlargement rate may be changed. Further, a character string preliminarily displayed in the text field 618 may also be displayed with a changed display color so as to visualize that the character string is fixed. For example, a character string of the text field may be displayed with a gray character during preliminary display and may be displayed with a black character after fixed.

When a character region selected once is clicked again, the selection is cancelled, and a character string of a corresponding file name is deleted back to a state where neither the line nor the color added to the character region is displayed. It is illustrated in the example that, when a character string is in a not-selected state, no character region is displayed on the preview.

However, to indicate to the user which region can be clicked, display with a color or a frame line may be used to make a character region distinguishable. Further, display to distinguish a character region may be switched between a displayed state and a not-displayed state by a button or the like. Further, when a swipe operation is performed on a preview region, the position of an image displayed in the preview region is moved.

The character region deletion button 613 is used for deleting a character region linked to the character region deletion button 613 and updating the attribute region 611 related to the character region. Specifically, a corresponding character string of the text field 618 is deleted, and the cutout image 619 is set to a not-set state.

The preview enlargement button 614 enlarges the enlargement rate of an image displayed in the preview region. The preview reduction button 615 reduces the enlargement rate of an image displayed in the preview region. Note that the display position is adjusted such that the center coordinates of the preview region after enlargement or reduction are the same as those before the enlargement or reduction. The preview initial display button 616 is used for restoring the display magnification and the display position to those of the initial state if the display position of the preview image has been moved by a swipe operation or the display magnification has been changed by pressing of the preview enlargement button or the preview reduction button.

The OK button 617 is used for transmitting a scanned image to the MFP cooperative service server 120 together with a file name set by the attribute setting window 610 and performing a machine learning process (S515 to S518). In response to completion of the transmission, the window returns to the scanned business form list window 600.

Figure 7:
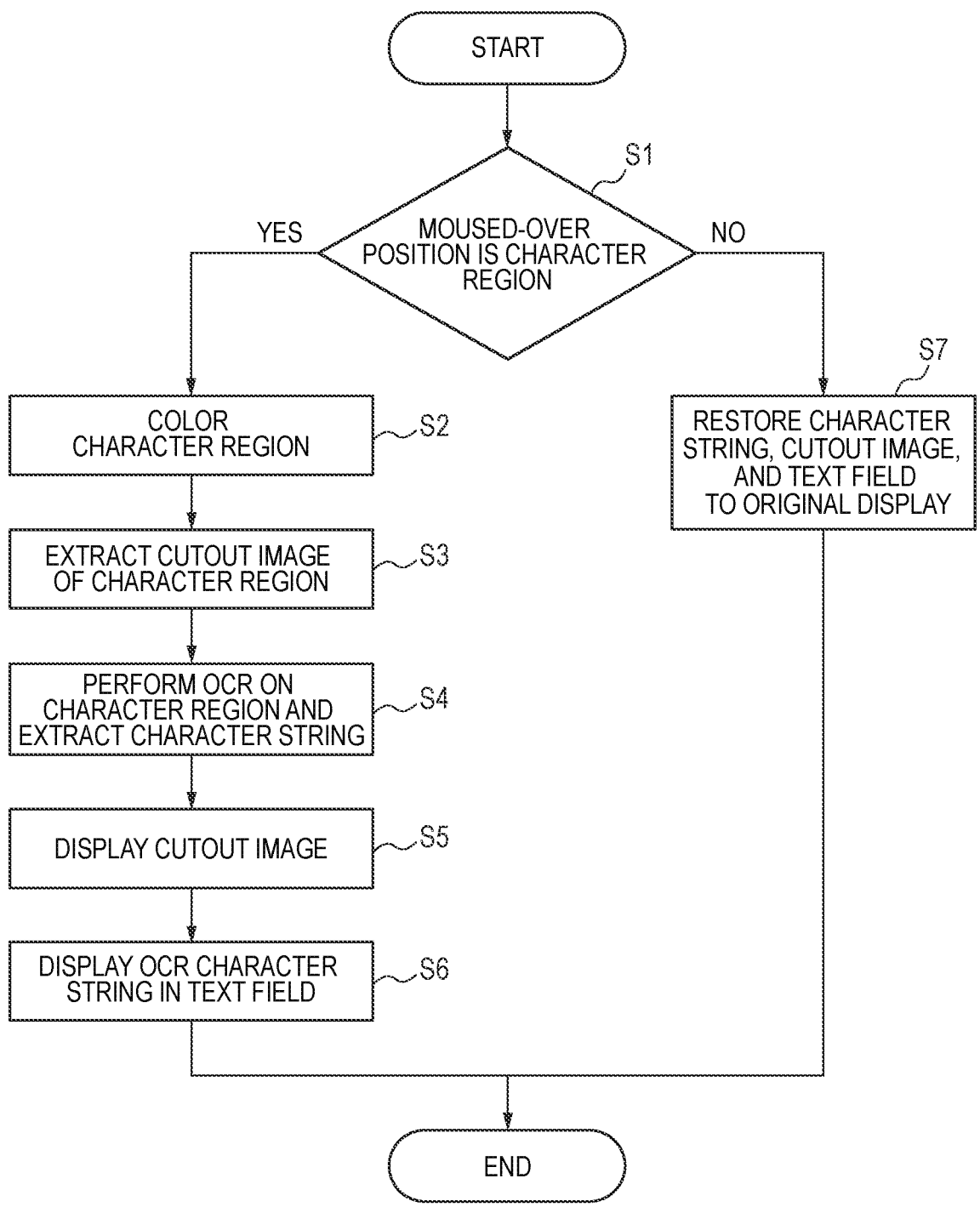
FIG. 7 is a flow of a display process of a character region of a scanned image in the present disclosure.

FIG. 7 is a flowchart illustrating details of a display process in this system when a character region is moused over. This process is repeatedly performed when the cursor is on the preview window.

First, in S1, it is determined whether or not the moused-over position is in a character region. If it is determined in S1 that the moused-over position is in a character region (Yes), the process proceeds to S2, and if it is determined in S1 that the moused-over position is not in a character region (No), the process proceeds to S7.

If the moused-over position is in a character region, in S2, the character region being moused over is displayed so as to be identifiable by the user. For example, the character region is displayed with a figure such as a line or a frame line, or the character region is displayed with a changed background color.

In subsequent S3, an image is cut out along the frame of the character region being moused over, and thereby a cutout image is extracted.

In S4, a character string in the character region being moused over is extracted. At the time of S4, an OCR process may be performed, and the character string may be extracted. Further, an OCR process may be performed on the whole character region within the preview image in advance, or a result of character recognition process performed on the whole character region in S510 may be acquired and used as a response to the acquisition request of the analysis result of S513.

In S5, the cutout image 619 extracted in S3 is displayed in the attribute region. Furthermore, in S6, the character string extracted in S4 is displayed in the text field 618 of the attribute region, and this flow ends.

Note that, if it is determined in S1 that the moused-over position is not in a character region, in S7, the frame or the line added to the character region is removed, the cutout image and the text field of the attribute region are restored to the original display, and this flow ends.

Next, a second embodiment will be described. In the first embodiment, when the character region is moused over in the determination process of FIG. 7, a cutout image and a character string of the character region are displayed in the attribute region, and this enables the user to confirm whether or not a correct character region is set. However, since neither a figure such as a frame or a line nor a color is added in an identifiable manner to the character region unless the character region is moused over, the user may be less likely to be aware of the mouse-over operation on the character region. In the second embodiment, an example of adding a figure such as a frame or a line or a color to the whole character region within a preview image when a preview region displaying a preview image is moused in will be described.

Figures 8A, 8B:
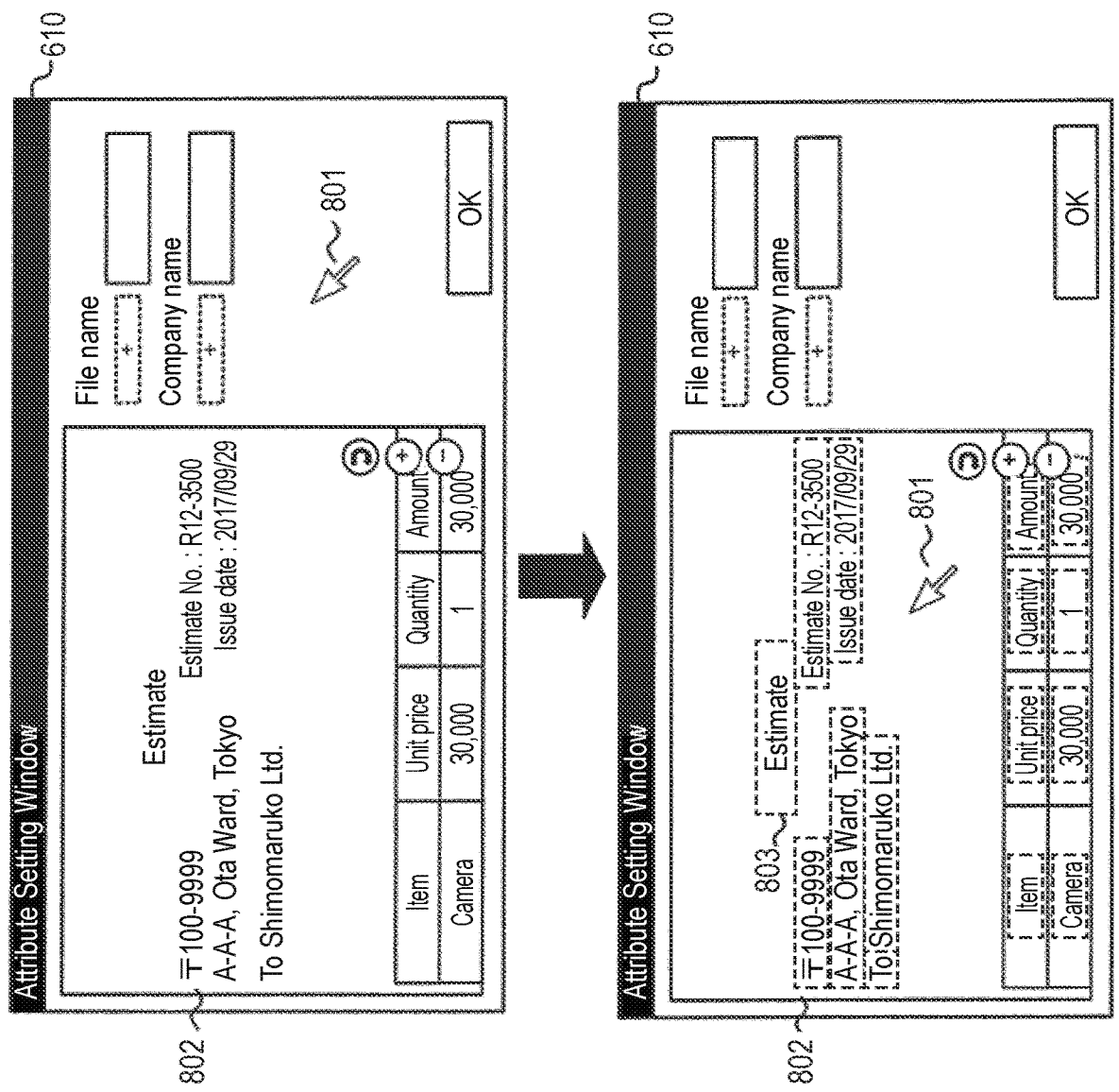
FIG. 8A and FIG. 8B are diagrams illustrating an example of a window on an operation unit of an MFP in a second embodiment.

FIG. 8A and FIG. 8B are diagrams illustrating an example of the attribute setting window 610.

FIG. 8A illustrates a case where a mouse cursor 801 is outside a region of a preview image 802. At this point of time, neither a figure such as a frame or a line nor a color is added to the character region within the preview image 802.

On the other hand, when the mouse cursor 801 is inside the region of the preview image as illustrated in FIG. 8B, a figure such as a frame or a line or a color is added so that the whole character region within the preview image 802 can be identified (803). Then, in this state, when the character region within a preview image is moused over as described in the first embodiment, a different color or figure from the color or figure added to the whole character region is added to the moused-over character region, and thereby the character region is displayed in an identifiable manner.

Other Embodiments

The aspect of the embodiments has been described as a system that combines an image processing apparatus (MFP), the MFP cooperative service server, and a cloud storage, however, respective described functions may be provided in other apparatuses, respectively. For example, all the functions may be provided in the image processing apparatus (MFP), or a service server may be one having a storage function.

Further, in the disclosure, although a similar business form is determined from arrangement information on a character region of a business form, a neural network that has learned the relationship between arrangement information on a character region and a business form may be used for performing the determination.

Further, the selection function of a character region of an image in the disclosure is applicable to any information processing apparatus that can display an image and on which the image can be selected.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-067335, filed Apr. 3, 2020, which is hereby incorporated by reference herein in its entirety.

What is claimed is:

1. A system comprising:
a memory that stores instructions; and
a processor that executes the instructions to perform:
controlling a display to displays a setting window including at least a preview region and an attribute region, wherein the preview region is used for previewing a scanned image, and wherein the attribute region includes a text field for inputting attribute information to be set to the scanned image; and
controlling the display to preliminarily display, while one of character regions within the scanned image previewed in the preview region is moused over with a mouse, a character string corresponding to the moused-over one of the character regions in the text field;
controlling the display to fix the preliminarily displayed character string in the text field when the moused-over character region within the scanned image previewed in the preview region is clicked with the mouse; and
controlling the display to remove the preliminarily displayed character string from the text field when the mouse is moved to a region other than the moused-over character region without clicking the moused-over character region with the mouse.

2. The system according to claim 1, wherein when the one of character regions within the scanned image previewed in the preview region is moused over with the mouse, the processor controls the display to preliminarily display the character string corresponding to the moused-over one of the character regions in the text field and preliminarily display a cutout image of the moused-over character region near the text field in the attribute region.

3. The system according to claim 1, wherein when a mouse cursor enters the preview region, the processor controls the display to display all of the character regions in the preview image so as to be identifiable to a user and, further, when the one of the character regions within the previewed scanned image is moused over, controls the display to change display of the moused-over character region in a form different from that of identifying display of all of the character regions so that the moused-over character region is identifiable in the scanned image displayed in the preview region.

4. The system according to claim 1, wherein the processor executes the instructions to further perform region analysis on the scanned image to identify the character regions.

5. The system according to claim 1, wherein the processor executes the instructions to further perform an optical character recognition process to acquire a character string corresponding to the character region within the scanned image.

6. The system according to claim 1, wherein the processor executes the instructions to further perform storing the fixed character string as attribute information on the scanned image.

7. The system according to claim 6, wherein the processor executes the instructions to further perform storing the fixed character string in an external storage as attribute information on the scanned image.

8. A method comprising:
controlling a display to display a setting window including at least a preview region and an attribute region, wherein the preview region is used for previewing a scanned image, and wherein the attribute region includes and a text field for inputting attribute information to be set to the scanned image; and controlling the display to preliminarily display, while one of character regions within the scanned image previewed in the preview region is moused over with a mouse, a character string corresponding to the moused-over character region in the text field and, when the moused-over one of the character regions is clicked by a mouse; and controlling the display to remove the preliminarily displayed character string from the text field when the mouse is moved to a region other than the moused-over character region without clicking the moused-over character region with the mouse.

9. The method according to claim 8 further comprising, when the one of character regions within the scanned image previewed in the preview region is moused over with the mouse, controlling the display to preliminarily display the character string corresponding to the moused-over one of the character regions in the text field and preliminarily display a cutout image of the moused-over character region near the text field in the attribute region.

10. The method according to claim 8, further comprising, when a mouse cursor enters the preview region, controlling the display to display all of the character regions in the preview image so as to be identifiable to a user and, further, when the one of the character regions within the previewed scanned image is moused over, controlling the display to change display of the moused-over character region in a form different from that of identifying display of all of the character regions so that the moused-over character region is identifiable in the scanned image displayed in the preview region.

11. The method according to claim 8, further comprising performing region analysis on the scanned image to identify the character regions within the scanned image.

12. The method according to claim 8, further comprising performing an optical character recognition process to acquire a character string corresponding to the character region within the scanned image.

13. The method according to claim 8 further comprising storing the fixed character string as attribute information on the scanned image.

14. The method according to claim 13, further comprising storing the fixed character string in an external storage as attribute information on the scanned image.

15. A non-transitory computer readable storage medium storing a program, wherein the program causes a computer to perform:

controlling a display to display a setting window including at least a preview region and an attribute region, wherein the preview region is used for previewing a scanned image, and wherein the attribute region includes a text field for inputting attribute information to be set to the scanned image; and controlling the display to preliminarily display, while one of character regions within the scanned image previewed in the preview region is moused over with a mouse, a character string corresponding to the moused-over one of the character regions in the text field;

controlling the display to fix the preliminarily displayed character string in the text field when the moused-over character region within the scanned image previewed in the preview region is clicked with the mouse; and controlling the display to remove the preliminarily displayed character string from the text field when the mouse is moved to a region other than the moused-over character region without clicking the moused-over character region with the mouse.

16. The non-transitory computer readable storage medium according to claim 15, wherein the program further causes the computer to perform, when the one of character regions within the scanned image previewed in the preview region is moused over with the mouse, controlling the display to preliminarily display the character string corresponding to the moused-over one of the character regions in the text field and preliminarily display a cutout image of the moused-over character region near the text field in the attribute region.

17. The non-transitory computer readable storage medium according to claim 15, wherein the program further causes the computer to perform, when a mouse cursor enters the preview region, controlling the display to display all of the character regions in the preview image so as to be identifiable to a user and, further, when the one of the character regions within the previewed scanned image is moused over, controlling the display to change display of the moused-over character region in a form different from that of identifying display all of the character regions so that the moused-over character region is identifiable in the scanned image displayed in the preview region.

18. The non-transitory computer readable storage medium according to claim 15, wherein the program further causes the computer to perform region analysis on the scanned image to identify the character regions within the scanned image.

19. The computer readable storage medium according to claim 15, wherein the program further causes the computer to perform an optical character recognition process to acquire a character string corresponding to the character region within the scanned image.

20. The non-transitory computer readable storage medium according to claim 15, wherein the program further causes the computer to perform storing the fixed character string as attribute information on the scanned image.

* * * * *